United States Patent
Riefe et al.

(10) Patent No.: US 6,769,715 B2
(45) Date of Patent: Aug. 3, 2004

(54) RESPONSIVE ENERGY ABSORBING DEVICE FOR A STEERING COLUMN

(76) Inventors: Richard Kremer Riefe, 821 Timberwood La., Saginaw, MI (US) 48609; David Michael Byers, 1381 Briarson Dr., Saginaw, MI (US) 48603; Richard Paul Nash, 6 Parkview Ct., Frankenmuth, MI (US) 48734

(*) Notice: Subject to any disclaimer, the term of this patent is extended or adjusted under 35 U.S.C. 154(b) by 0 days.

(21) Appl. No.: 10/264,963

(22) Filed: Oct. 3, 2002

(65) Prior Publication Data

US 2003/0075912 A1 Apr. 24, 2003

Related U.S. Application Data

(60) Provisional application No. 60/346,199, filed on Oct. 19, 2001.
(51) Int. Cl.[7] ............................................. B62D 1/19
(52) U.S. Cl. ...................... 280/777; 74/492; 188/371; 188/374
(58) Field of Search .................. 280/777; 188/371, 188/374; 74/492, 493

(56) References Cited

U.S. PATENT DOCUMENTS

| 4,142,423 A | * | 3/1979 | Ikawa | 74/492 |
|---|---|---|---|---|
| 4,630,716 A | * | 12/1986 | Faust | 188/371 |
| 5,040,646 A | * | 8/1991 | Drefahl | 188/371 |
| 5,375,881 A | * | 12/1994 | Lewis | 280/777 |
| 5,487,562 A | * | 1/1996 | Hedderly et al. | 280/777 |
| 5,605,352 A | * | 2/1997 | Riefe et al. | 280/777 |
| 5,788,278 A | * | 8/1998 | Thomas et al. | 280/777 |
| 6,170,874 B1 | * | 1/2001 | Fosse | 280/777 |
| 6,176,151 B1 | | 1/2001 | Cymbal | |
| 6,189,929 B1 | * | 2/2001 | Struble et al. | 280/777 |
| 6,189,941 B1 | * | 2/2001 | Nohr | 293/118 |
| 6,234,528 B1 | * | 5/2001 | Ben-Rhouma et al. | 280/777 |
| 6,322,103 B1 | * | 11/2001 | Li et al. | 280/777 |
| 6,439,607 B1 | * | 8/2002 | Jurik et al. | 280/777 |
| 6,450,532 B1 | | 9/2002 | Ryne et al. | |
| 6,454,302 B1 | * | 9/2002 | Li et al. | 280/777 |
| 6,478,333 B1 | * | 11/2002 | Barton et al. | 280/777 |
| 6,575,497 B1 | * | 6/2003 | McCarthy et al. | 280/777 |

* cited by examiner

Primary Examiner—Paul N. Dickson
Assistant Examiner—Deanna Draper

(57) ABSTRACT

An energy absorbing device includes a plastically deformable metal strap for resisting the collapse of a steering column. The strap is initially deformable into one or more V-shaped wave formations by anvils to increase the energy required to advance the strap, thereby increasing the resistance to collapse of the steering column. One of the anvils may be removed to eliminate one of the wave formations and thereby reduce the amount of resistance to collapse of the steering column. Alternatively, the position of an anvil may be varied to vary the shape of a wave configuration from a deep V to a shallow V.

16 Claims, 5 Drawing Sheets

RESPONSIVE ENERGY ABSORBING DEVICE FOR A STEERING COLUMN

REFERENCE TO RELATED APPLICATIONS

This application claims the benefit of U.S. Provisional Application No. 60/346,199, filed Oct. 19, 2001.

TECHNICAL FIELD

This application relates generally to steering columns and more particularly to a responsive energy absorbing device for a steering column.

BACKGROUND OF THE INVENTION

Many steering column assemblies today are equipped with kinetic energy absorption devices to reduce the likelihood of injury in case of an accident. Such devices come in many different forms. One form that is particularly effective in absorbing significant quantities of energy in a relatively small amount of space employs a plastically deformable member such as a metal strap which is bent over an anvil. In the event of a head-on collision, the deformable strap is drawn across the anvil and the deformed shape travels along the length of the strap, causing a reaction force resisting collapse of the steering column and absorbing energy.

Typically energy absorbing devices, such as those employing a plastically deformable strap, are designed to protect drivers of average weight in a collision of average severity, without taking into account the fact that all drivers are not of average weight and that collisions vary considerably in severity depending on vehicle speed at the time of the impact.

SUMMARY OF THE INVENTION

In accordance with the present invention, it is possible to vary the reaction force resisting collapse of the steering column. For example, the energy absorbing device of this invention may provide a smaller amount of resistance in the case of a less severe collision or a lower weight driver, or a greater amount of resistance in the case of a more severe collision or a driver of greater weight.

The resistance is preferably provided by a plastically deformable strap supported on one side at spaced points. An anvil displaces a portion of the strap between the points of support into a V-shape to increase the energy required to advance the strap and thereby increase the resistance of the strap to the collapse of the steering column. The position of the anvil may be varied to vary the amount of displacement of the strap, or the anvil may be removed altogether depending upon conditions detected by a controller either before or at the instant of the collision.

In one form of the invention, several anvils may be provided to form the strap into two or more V-shaped wave formations with one of the anvils of at least one such formation in the form of a releasably supported pin. The releasably supported pin may be dropped out of the system in instances where less resistance to collapse is desired.

Further in accordance with the invention, one of the anvils may be supported in one position in which a section of the strap is displaced into a deep V-shaped configuration, or in another position in which the section of the strap assumes a shallow V-shape.

The resistance force of the deformable member is varied in proportion to the severity of the collision, or the occupant's weight, etc. Using measurements of the crash conditions, this invention relocates one or more of the V-shape forming anvils to vary the resistance force on the driver and this may be accomplished by an actuator. The actuator is actuated in only a few milliseconds preferably by a pyrotechnic device or electronic solenoid, which is responsive to a signal from a controller that measures the pertinent conditions existing at the time of the crash.

This invention extends the range of effective injury reduction of an energy absorbing steering column by increasing or decreasing the reaction force available during the displacement of the steering column in response to driver weight and vehicle speed measurements before or during the crash event.

One object of this invention is to provide an energy absorbing device having the foregoing features and capabilities.

BRIEF DESCRIPTION OF THE DRAWINGS

The present invention will now be described, by way of example, with reference to the accompanying drawings, in which.

DETAILED DESCRIPTION OF THE PREFERRED EMBODIMENTS

Figure 1A:
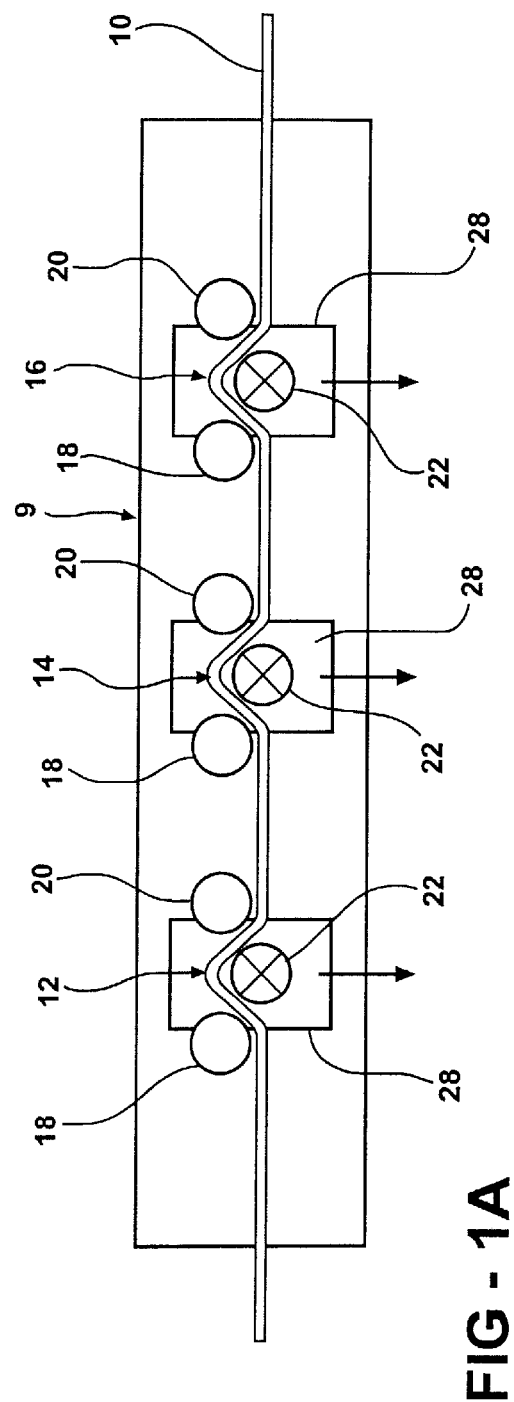
FIG. 1A is a diagrammatic view illustrating an energy absorbing device including a plastically deformable strap and anvils, constructed in accordance with the invention.
Figure 1B:
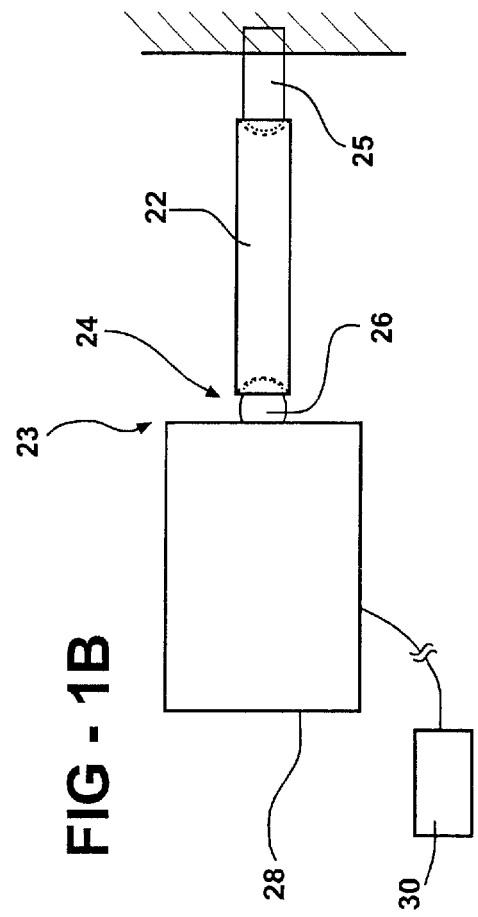
FIG. 1B is a diagrammatic view illustrating a support system for one of the anvils shown in FIG. 1A.

Referring now more particularly to the drawings and especially to FIGS. 1A and 1B, there is shown diagrammatically an energy absorbing device 9 embodying the principals of this invention, for use in absorbing energy during the collapse of a steering column.

An elongated plastically deformable metal strap 10 is shown initially deformed into three V-shaped wave formations 12, 14 and 16 spaced apart along the length of the strap. Each of the wave formations is supported on one side by longitudinally spaced apart fixed anvils 18 and 20. The opposite side of each wave formation is supported by a third anvil 22 which is shown in a position in which it displaces a portion of the strap between the fixed anvils 18 and 20 into a V-shape. The strap 10 is adapted to move lengthwise relative to the anvils 18, 20 and 22 when the steering column collapses, causing the V-shaped wave formations 12, 14 and 16 to move along the length of the strap and increase the energy required to move the strap, thereby increasing the resistance of the strap to the collapse of the steering column.

Each of the anvils 22 is in the form of a pin, and as shown in FIG. 1B, the pin is releasably supported by an anvil support mechanism 23 having a holder 24 including spindles 25 and 26 extending into hollow ends of the pin. The spindle 25 is fixed, and the spindle 26 is carried by an actuator 28 which may be in the form of a piston-cylinder assembly adapted to extend and retract the spindle 26. The spindle 26 when extended causes the anvil 22 to be supported between the spindles as shown in FIG. 1B. When a spindle 26 is retracted, the anvil 22 drops out and the V-shaped configuration of the strap between the associated fixed anvils 18 and 20 of a given wave formation flattens out and therefore does not serve to increase the resistance to the advance of the strap. The actuators 28 are operated by a signal generated by a controller 30. The controller 30 includes sensors for sensing such variables as the weight of the driver, the driver's seat position, and vehicle speed at the time of a collision. Except for vehicle speed, some of the variables may be sensed before the collision. The actuator 28 is actuated in only a few milliseconds after it receives a signal from the controller 30, as by a pyrotechnic device on an electronic solenoid.

Figure 2:
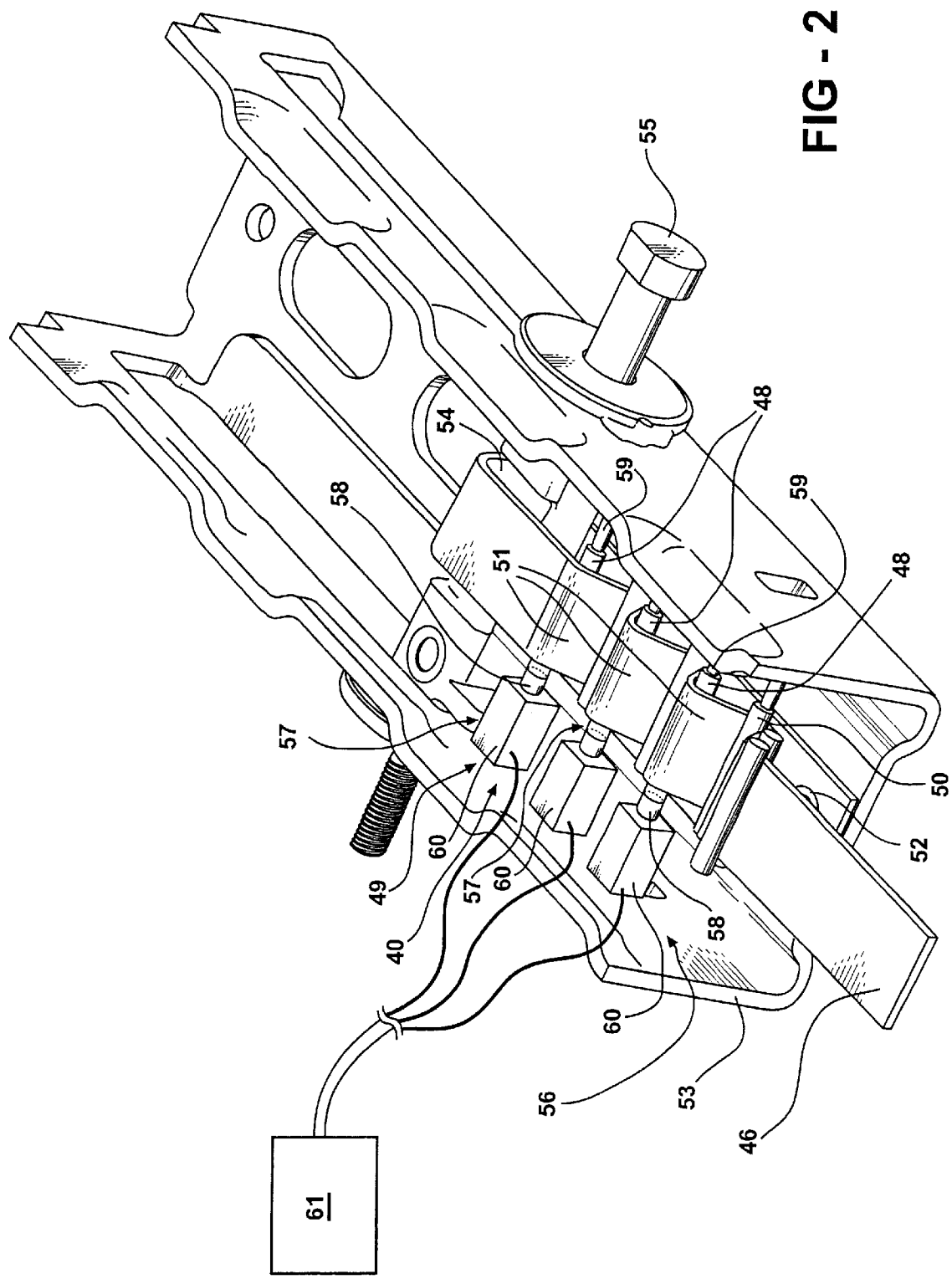
FIG. 2 is a perspective view showing an energy absorbing device incorporating the principals of the device of FIGS. 1A and 1B, for use in a steering column of a vehicle, but with the steering column removed.
Figure 3:
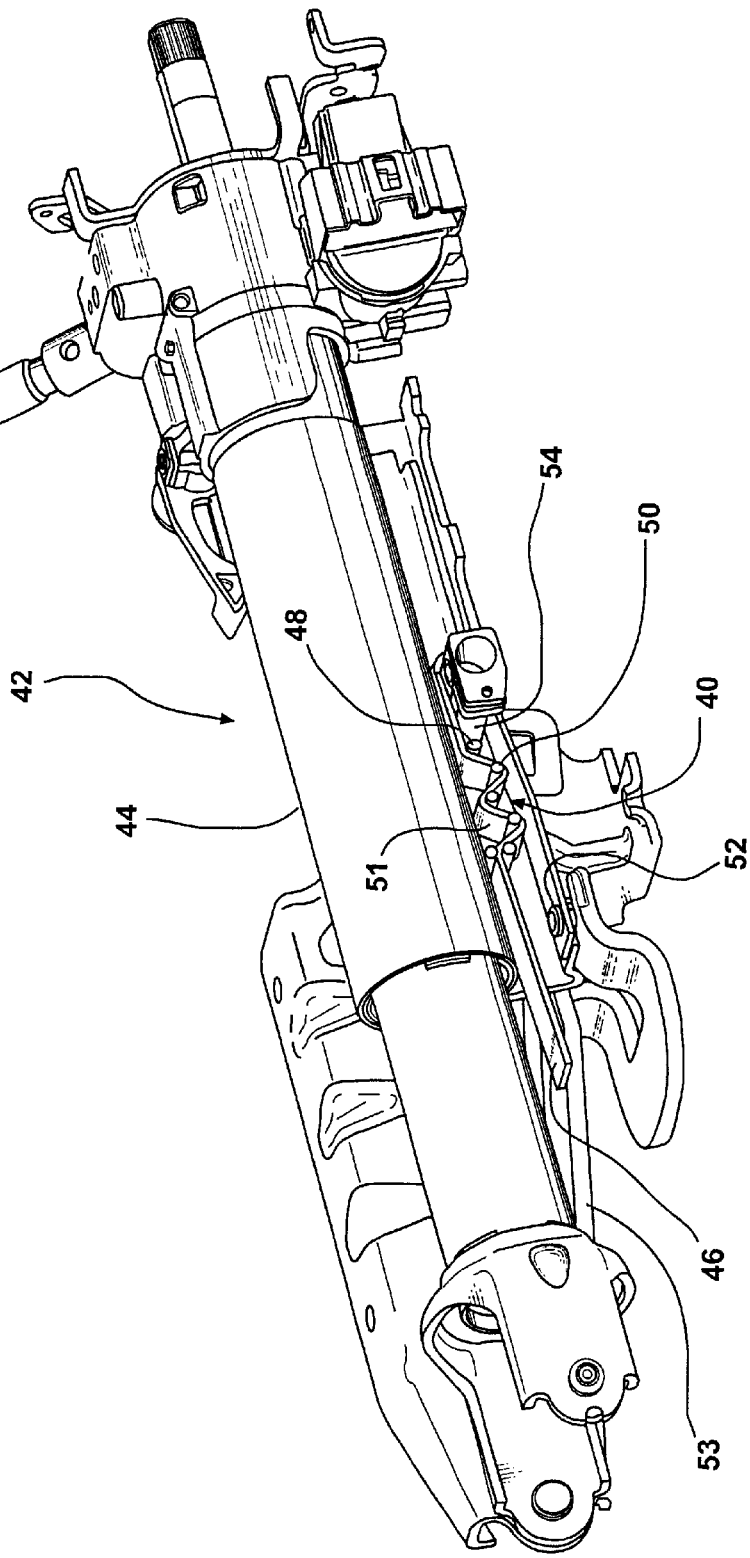
FIG. 3 is a perspective view of the steering column incorporating the energy absorbing device of FIG. 2.

Referring to FIGS. 2 and 3, an energy absorbing device 40, incorporating the principals of the device shown in FIGS. 1A and 1B, is provided for a steering column assembly 42 that includes a collapsible upper steering column 44. An elongated plastically deformable metal strap 46 which is part of the energy absorbing device 40 is extended over and under a series of spaced apart upper anvils 48 and lower anvils 50. The anvils 48 engage the under side of the strap 46 and the anvils 50 engage the upper side thereof. The anvils are in the form of pins and are spaced apart as shown so that the strap has a number of wave formations 51 of V-shaped configuration. One end of the strap 46 is anchored as by a rivet 52 to a bracket 53 of the energy absorbing device 40. From the anchored end, the strap 46 extends around an anvil 54 which is secured to stationary vehicle support structure by a mounting bolt 55. The strap continues from the anvil 54 over and under the previously described anvils 48 and 50 to its free end.

Each of the upper anvils or pins 48 is releasably supported by an anvil support mechanism 56 comprising a holder 57 including a pair of spindles, one of which is shown at 58 and supports one end of the pin 48. The other spindle 59 is fixed to the bracket 53 and supports the other end of the pin. Each spindle 58 is extendable and retractable by an actuator 60 which may be of the piston-cylinder type previously described. The actuators 60 are mounted on the bracket 53 and the bracket 53 is secured to the upper steering column 44. Thus the actuators 60 move with the upper steering column 44 when the steering column collapses.

The actuators 60 are controlled by a controller 61 which, as previously indicated, has sensors for sensing the various conditions such as vehicle speed, for example, that may call for varying the resistance to collapse of the steering column. A signal from the controller 61 to the actuators 60 in response to a vehicle collision event may have the effect of retracting one or more of the spindles 58 and ejecting the associated pin 48 so that the strap does not have to pass over the ejected pin. Eliminating one or more of the upper pins 48 in this manner alters the path of the strap 46 and thus decreases the energy absorption of the strap in a vehicle collision.

Figure 4:
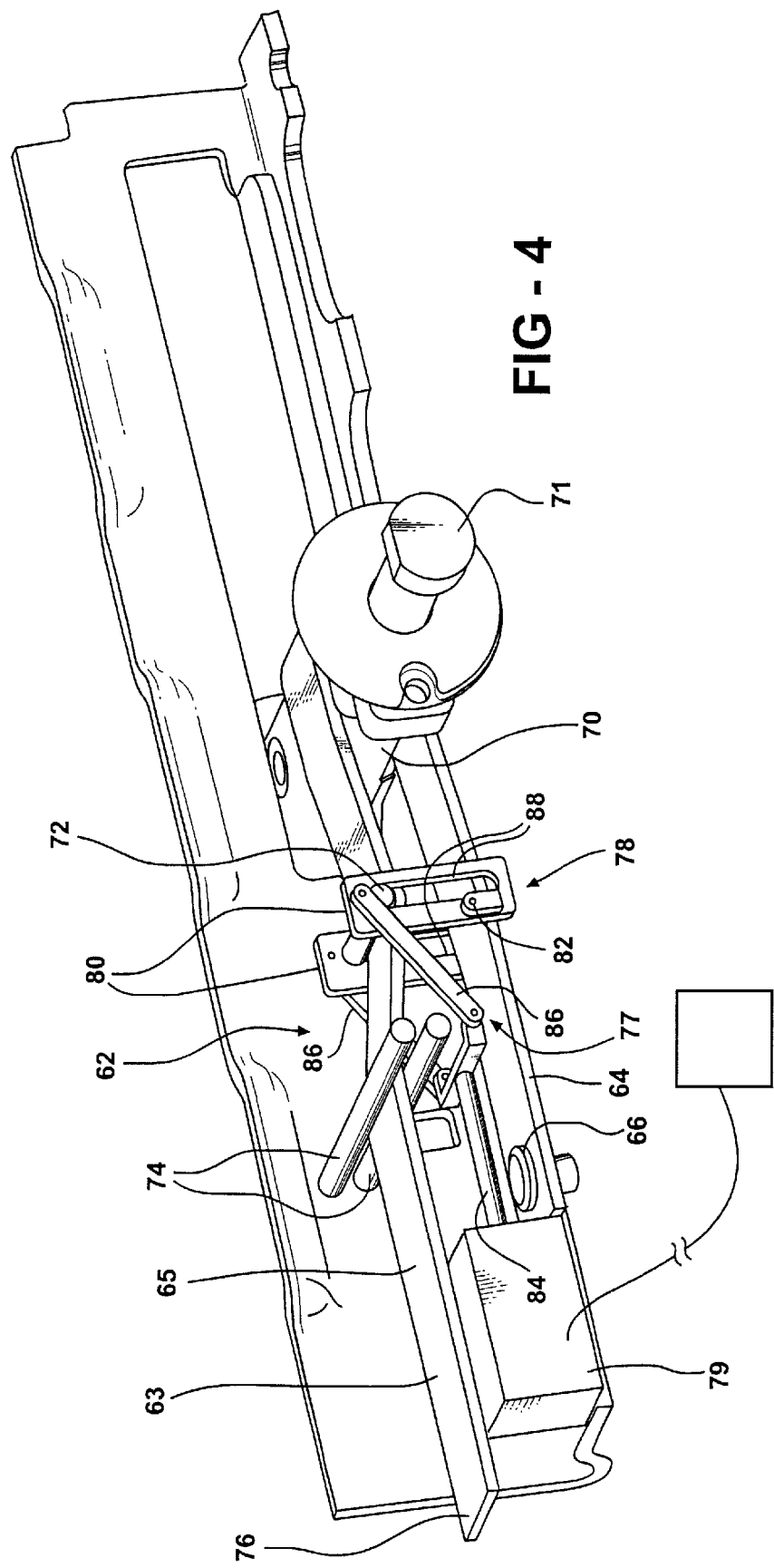
FIG. 4 is a perspective view showing an energy absorbing device of modified construction for use in a steering column.
Figure 5:
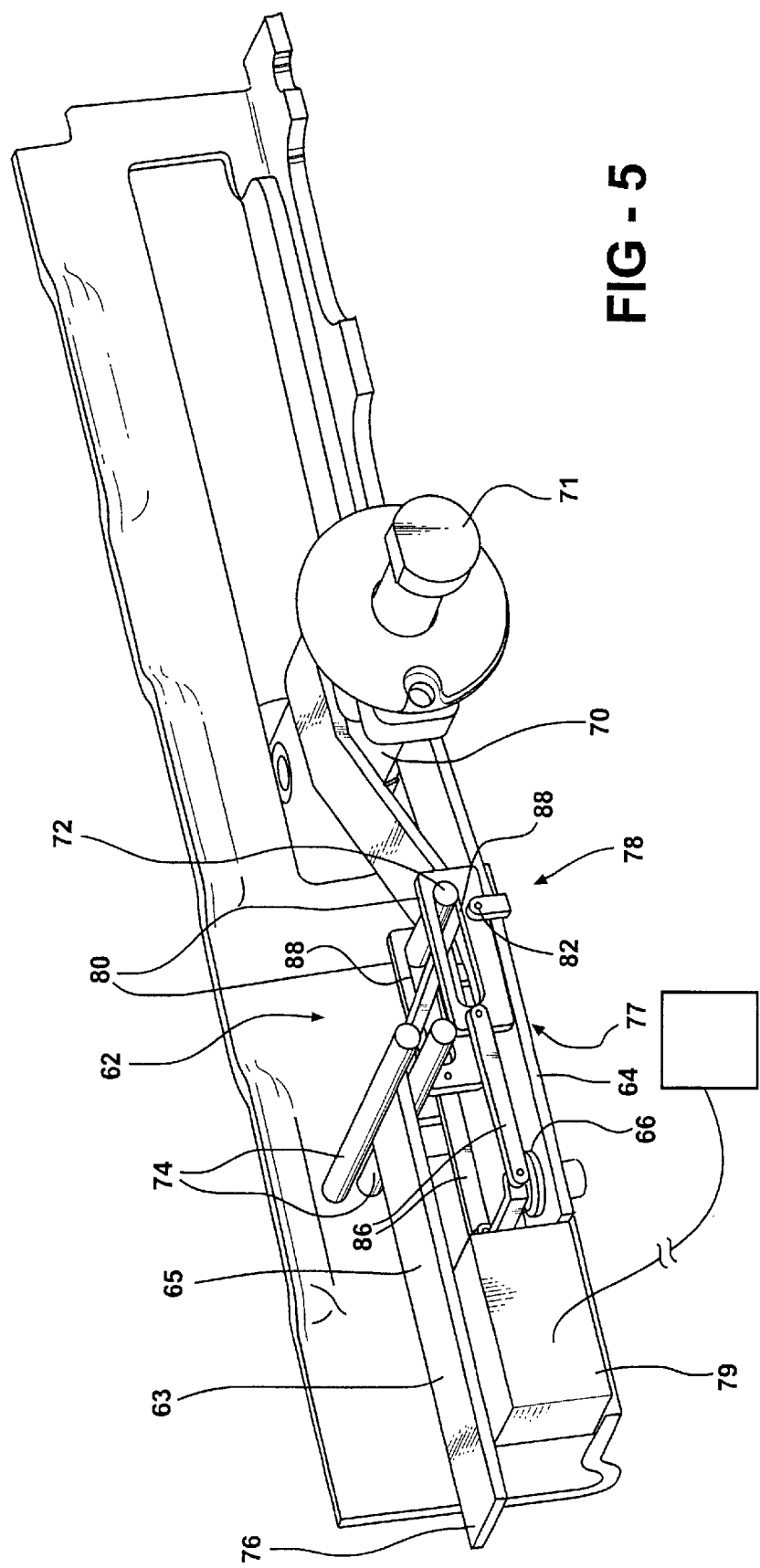
FIG. 5 is a view similar to FIG. 4 but with parts of the energy absorbing device in a different position.

FIGS. 4 and 5 illustrate another embodiment. An energy absorbing device is generally shown at 62 and includes a plastically deformable metal strap 63 having one end anchored to a bracket 64 by a rivet 66 or other suitable fastener. The bracket is coupled to an upper collapsible steering column of a steering column assembly which is not shown but may be of the same construction as shown in FIG. 3. The strap 63 extends around a fixed anvil 70 which is secured by mounting bolt 71 to stationary vehicle structure. The anvil 70 remains stationary and the bracket 64 slides with the upper column in response to a collapse of the column during a crash event.

An upper run 65 of the strap 63 extends beneath a movable upper anvil 72 and through a set of upper and lower guide anvils 74 to a free end 76. The guide anvils 74 are secured to the bracket 64. The upper movable anvil 72 is in the form of a pin and is supported by an anvil support mechanism 77 including a linkage 78 coupled to an actuator 79. The actuator 79 is mounted on the bracket 64 and is operative to move the upper pin 72 between a low energy absorption position shown in FIG. 4, and a high energy absorption position shown in FIG. 5. In the FIG. 5 position, the pin 72 has been lowered to deepen the V-shaped path through which the strap 63 must travel during collapse of the steering column, requiring a corresponding increase in energy to move the strap. The linkage 78 includes a pair of spaced apart guide links 80 which are connected at one end to the bracket 64 by a pivot 82 for pivotal movement between the positions of FIGS. 4 and 5. The actuator 79 has a rod 84 which is connected by pivoted transfer links 86 to the opposite end of the guide links 80. The movable anvil 72 is received in elongated guide slots 88 in the guide links 80, and is slidable along the slots 88 between the low and high energy absorption positions as illustrated in FIGS. 4 and 5, in response to movement of the linkage 78 by actuation of the actuator 79.

A controller 90, at the instant of a crash, senses various conditions such as driver weight, seat position, and speed of the vehicle and generates a signal which is sent to the actuator 79. In response to the signal received by the actuator 79, the actuator moves the anvil 72 to an appropriate position adjusting it up or down as required. In the event that the controller signal indicates that the energy absorbing device should provide low energy absorption, the actuator 79 will react by extending the rod 84 and thus move the linkage 78 to the upright position shown in FIG. 4 so as to provide a low bend path for the strap 63 corresponding to the desired low-energy absorption desired. In the event that the controller 90 determines that a greater energy absorption is required, the signal to the actuator 79 will cause the rod 84 to retract partially or fully to increase the bend path of the strap 63 and thereby increase the amount of energy absorbed by the strap. FIG. 5 shows a position of maximum energy absorption where the pin 72 is moved downwardly to a position corresponding to full retraction of the rod 84 and a relatively deep V configuration of the strap 63 between the fixed anvil 70 and the anvils 74. The pin 72 is also infinitely adjustable between the positions of FIGS. 4 and 5. The actuator 79 includes a pyrotechnic device or electronic solenoid or similar fast-acting device and therefore responds to the signal from the controller almost instantaneously.

What is claimed is:

1. An energy absorbing device for a collapsible steering column of a vehicle, comprising:

an elongated, plastically deformable strap for resisting the collapse of the steering column, spaced apart supports for supporting one side of the strap at longitudinally spaced points, an anvil engageable with an opposite side of the strap between said supports, said strap and said anvil being relatively moveable to cause said strap to advance linearly across said supports and said anvil when the steering column collapses, and an anvil support mechanism selectively operable a) to maintain said anvil in an extended position in which said anvil displaces a portion of the strap between the supports into a V-shape of a given angle to increase the energy required to advance said strap and thereby increase the resistance of said strap to the collapse of the steering column, or B) to release said anvil from said extended position, said anvil being in the form of a pin and said holder comprising spindles releasably engagable engageable with opposite ends of said pin, said anvil support mechanism comprising a holder for releasably holding said anvil.

2. The energy absorbing device of claim 1, wherein said support mechanism is operable by an actuator, and said actuator is operable by a signal generated by a controller in response to a vehicle collision.

3. The energy absorbing device of claim 1, wherein said spindles are relatively movable toward one another into engagement with the ends of said pin and away from one another out of engagement with the ends of said pin permitting said pin to disengage the strap.

4. The energy absorbing device of claim 3, wherein said spindles are relatively movable by an actuator, and said actuator is actuated by a signal from a controller in response to a vehicle collision.

5. The energy absorbing device of claim 4, further including additional spaced apart anvils for supporting opposite sides of said strap and cooperating with one another to displace another portion of said strap into a V-shape.

6. The energy absorbing device of claim 1, wherein said anvil support mechanism includes a linkage engaging said anvil and operable to move said anvil to and form said extended position.

7. The energy absorbing device of claim 1, wherein said anvil support mechanism includes a pivotally mounted linkage connected to said anvil, said linkage being pivotable between a first position supporting said anvil in said extended position and a second position supporting said anvil in a retracted position.

8. The energy absorbing device of claim 7, wherein said anvil in said retracted position displaces the portion of the strap between said supports into a V-shaped configuration of a lesser angle than said given angle.

9. The energy absorbing device of claim 8, wherein said anvil is infinitely adjustable by said linkage between said extended position and said retracted position.

10. The energy absorbing device of claim 9, wherein said linkage and said anvil are connected by a pin and slot connection.

11. The energy absorbing device of claim 10, wherein said support mechanism is operable by an actuator, and said actuator is actuated by a controller in response to a vehicle collision.

12. An energy absorbing device for a collapsible steering column of a vehicle, comprising:

an elongated, plastically deformable strap for resisting the collapse of the steering column, spaced apart supports for supporting one side of the strap at longitudinally spaced points, an anvil engageable with an opposite side of the strap between said supports, said strap and said anvil being relatively moveable to cause said strap to advance linearly across said supports and said anvil when the steering column collapses, and an anvil support mechanism selectively operable a) to maintain said anvil in an extended position in which said anvil displaces a portion of the strap between the supports into a V-shape of a given angle to increase the energy required to advance said strap and thereby increase the resistance of said strap to the collapse of the steering column, or b) to release said anvil from said extended position, said anvil support mechanism including pivotally mounted linkage connected to said anvil, said linkage being pivotable between a first position supporting said anvil in said extended position and a second position supporting said anvil in a retracted position.

13. The energy absorbing device of claim 12, wherein said anvil in said retracted position displaces the portion of the strap between said supports into a V-shaped configuration of a lesser angle than said given angle.

14. The energy absorbing device of claim 13, wherein said anvil is infinitely adjustable by said linkage between said extended position and said retracted position.

15. The energy absorbing device of claim 14, wherein said linkage and said anvil are connected by a pin and slot connection.

16. The energy absorbing device of claim 15, wherein said support mechanism is operable by an actuator, and said actuator is actuated by a controller in response to a vehicle collision.

* * * * *